United States Patent [19]

Lawther

[11] Patent Number: 5,467,159
[45] Date of Patent: Nov. 14, 1995

[54] FILM TRANSPORT MECHANISM FOR CAMERA

[75] Inventor: Joel S. Lawther, Rochester, N.Y.

[73] Assignee: Eastman Kodak Company, Rochester, N.Y.

[21] Appl. No.: 368,688

[22] Filed: Jan. 3, 1995

[51] Int. Cl.$^6$ ..................................................... G03B 1/00
[52] U.S. Cl. ............................................. 354/212; 352/172
[58] Field of Search ......................................... 354/212, 214, 354/215, 218, 217; 352/172

[56] References Cited

U.S. PATENT DOCUMENTS

| | | |
|---|---|---|
| 4,274,728 | 6/1981 | Waaske . |
| 4,437,749 | 3/1984 | Ehgartner et al. ............ 354/214 |
| 4,540,261 | 9/1985 | Matsumoto et al. ............ 354/173.11 |
| 4,678,303 | 7/1987 | Desormeaux ............ 354/173.11 |
| 4,721,973 | 1/1988 | Harvey . |

Primary Examiner—Monroe H. Hayes
Attorney, Agent, or Firm—Roger A. Fields

[57] ABSTRACT

A film transport mechanism for a camera comprises a film take-up spool rotated to advance a filmstrip from a film cartridge onto the take-up spool, and a perforation sensor for detecting a turn-around perforation in a trailing end portion of the filmstrip to initiate return of the filmstrip from the take-up spool to the film cartridge. The perforation sensor is movable to a sensing position against the filmstrip to be able to drop into the turn-around perforation when the turn-around perforation is advanced to the perforation sensor. A film-on-spool sensor is located against an outermost convolution of the filmstrip as the filmstrip accumulates on the take-up spool, and is moved in response to increased accumulation of the filmstrip on the take-up spool to effect movement of the perforation sensor to its sensing position before the turn-around perforation can be advanced to the perforation sensor.

5 Claims, 4 Drawing Sheets

FIG. 2

FILM TRANSPORT MECHANISM FOR CAMERA

CROSS-REFERENCE TO RELATED APPLICATION(S)

Reference is made to commonly assigned copending applications Ser. No. 08/368,463, entitled FILM TRANSPORT MECHANISM FOR CAMERA and filed Jan. 4, 1995 in the name of Joel S. Lawther, and Ser. No. 08/367,660, entitled FILM TRANSPORT MECHANISM FOR CAMERA and filed in Jan. 3, 1995 the name of Joel S. Lawther, each of which are assigned to the assignee of this application.

FIELD OF THE INVENTION

The invention relates generally to the field of photography, and in particular to a film transport mechanism for a camera. More specifically, the invention relates to a film transport mechanism capable of returning a filmstrip automatically to a film cartridge after the last exposure in a camera.

BACKGROUND OF THE INVENTION

Typically in some cameras the film transport mechanism is motorized. In operation, a leading end portion of the filmstrip protruding from a lighttight film cartridge loaded in the camera is attached automatically to a film take-up spool. The take-up spool is rotated after each exposure to advance successive frames of the filmstrip from the cartridge, across the focal plane of a taking lens, and onto the take-up spool. Each time the take-up spool is rotated, an unexposed frame of the filmstrip is positioned in the focal plane of the taking lens and an exposed frame is wound onto the take-up spool. When all of the available frames have been exposed, a trailing end portion of the filmstrip remains attached to a supply spool inside the cartridge. This end-of-film condition produces a sudden increase in the film tension and in the motor current as the take-up spool attempts to withdraw the remainder of the filmstrip from the cartridge. A tension sensing device responds to the increase in the film tension, or a current detecting circuit responds to the increase in the motor current, by reversing the motor drive to rotate the supply spool inside the cartridge. The rotated spool draws the exposed frames off the take-up spool and rewinds them into the cartridge.

Alternatively, in place of a tension sensing device or a current detecting circuit, a perforation sensor may provided for detecting a turn-around perforation in the trailing end portion of the filmstrip to initiate return of the filmstrip from the take-up spool to the cartridge.

SUMMARY OF THE INVENTION

A film transport mechanism for a camera comprising a film take-up spool rotated to advance a filmstrip from a film cartridge onto the take-up spool, and a perforation sensor for detecting a turn-around perforation in a trailing end portion of the filmstrip to initiate return of the filmstrip from the take-up spool to the film cartridge, is characterized in that:

the perforation sensor is movable to a sensing position against the filmstrip to be able to drop into the turn-around perforation when the turn-around perforation is advanced to the perforation sensor; and film-on-spool sensor means is located against an outermost convolution of the filmstrip as the filmstrip accumulates on the take-up spool, and is moved in response to increased accumulation of the filmstrip on the take-up spool for effecting movement of the perforation sensor to its sensing position before the turn-around perforation can be advanced to the perforation sensor.

BRIEF DESCRIPTION OF THE DRAWINGS

FIGS. 2–4 are schematic views of a camera provided with a film transport mechanism comprising a film take-up spool rotated to advance the filmstrip from the film cartridge onto a take-up spool, and a perforation sensor for detecting the turn-around perforation to initiate return of the filmstrip from the take-up spool to the film cartridge, which depict operation of the film transport mechanism.

DETAILED DESCRIPTION OF THE INVENTION

The invention is disclosed as being embodied preferably in a still-picture camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
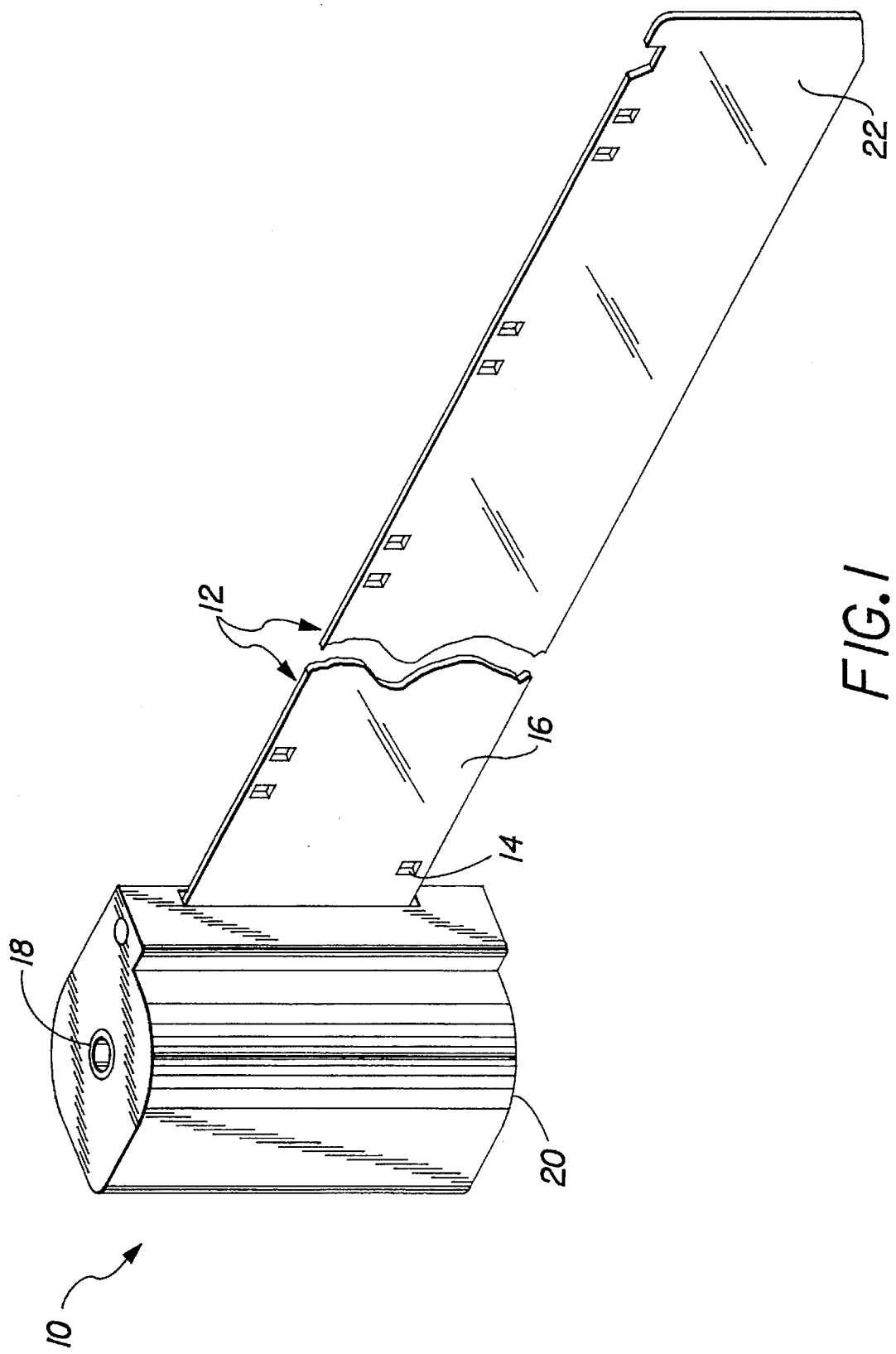
FIG. 1 is a perspective view of a film cartridge provided with a filmstrip having a turn-around perforation in a trailing end portion of the filmstrip.

Referring now to the drawings, FIG. 1 depicts a film cartridge 10 provided with a filmstrip 12 having a turn-around perforation 14 in a trailing end portion 16 of the filmstrip. The film cartridge 10 is similar to those disclosed in U.S. Pat. No. 5,305,504, issued Apr. 19, 1994, and No. 5,296,887, issued Mar. 22, 1994, in that unwinding rotation of a film supply spool 18 inside the cartridge housing 20 serves to advance or thrust the filmstrip 12 beginning with a leading end portion 22 from the cartridge interior.

Figure 2:
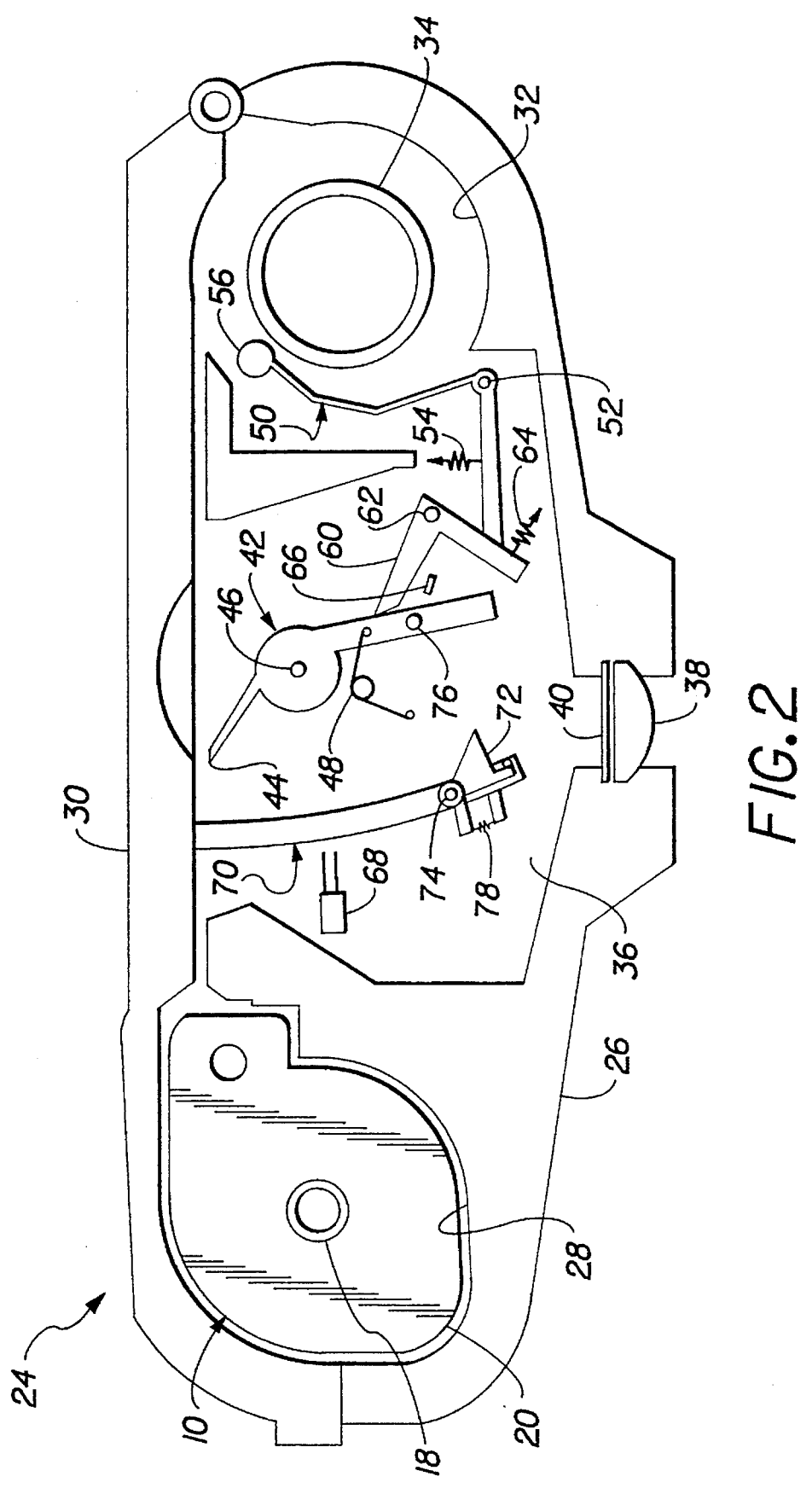
Figure 3:
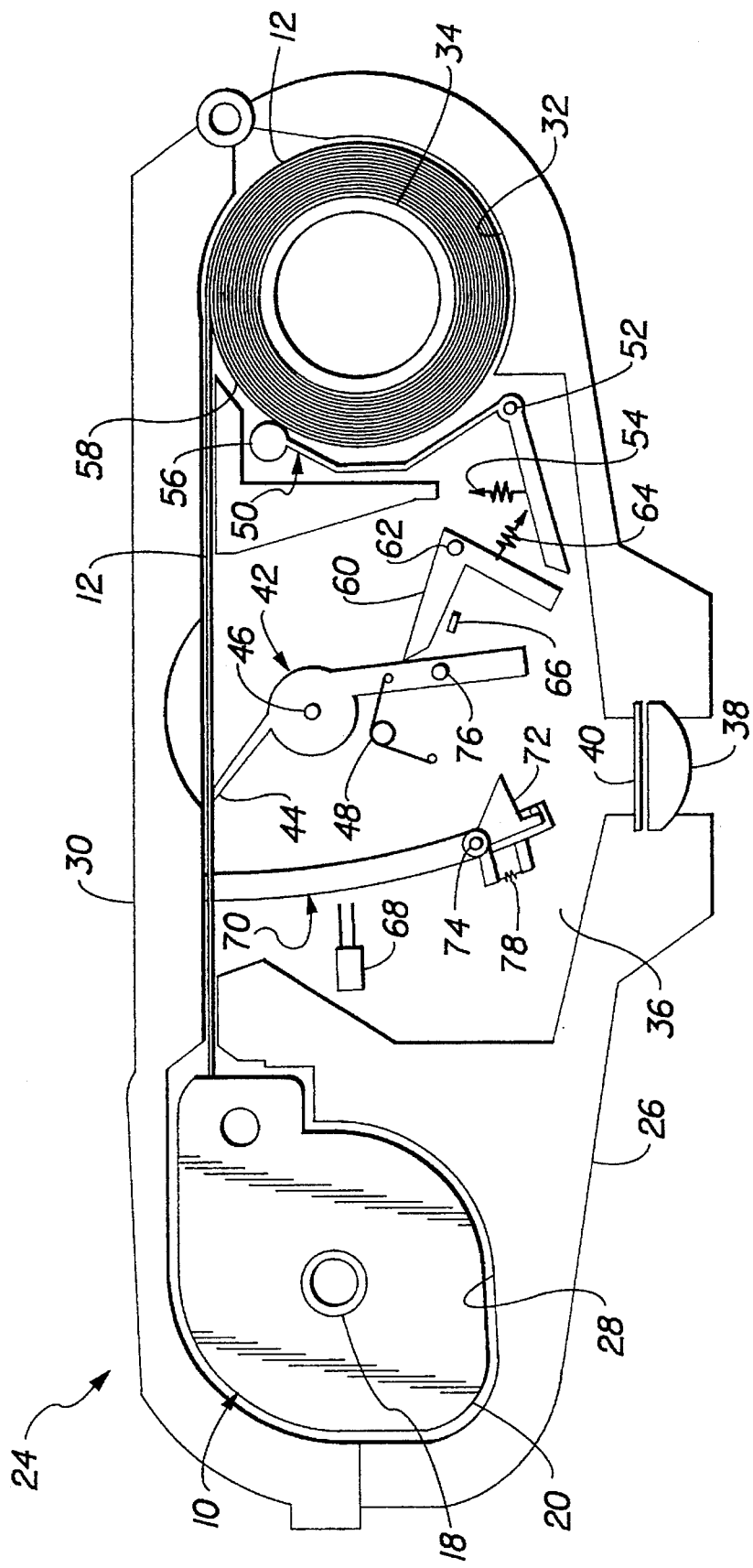
Figure 4:
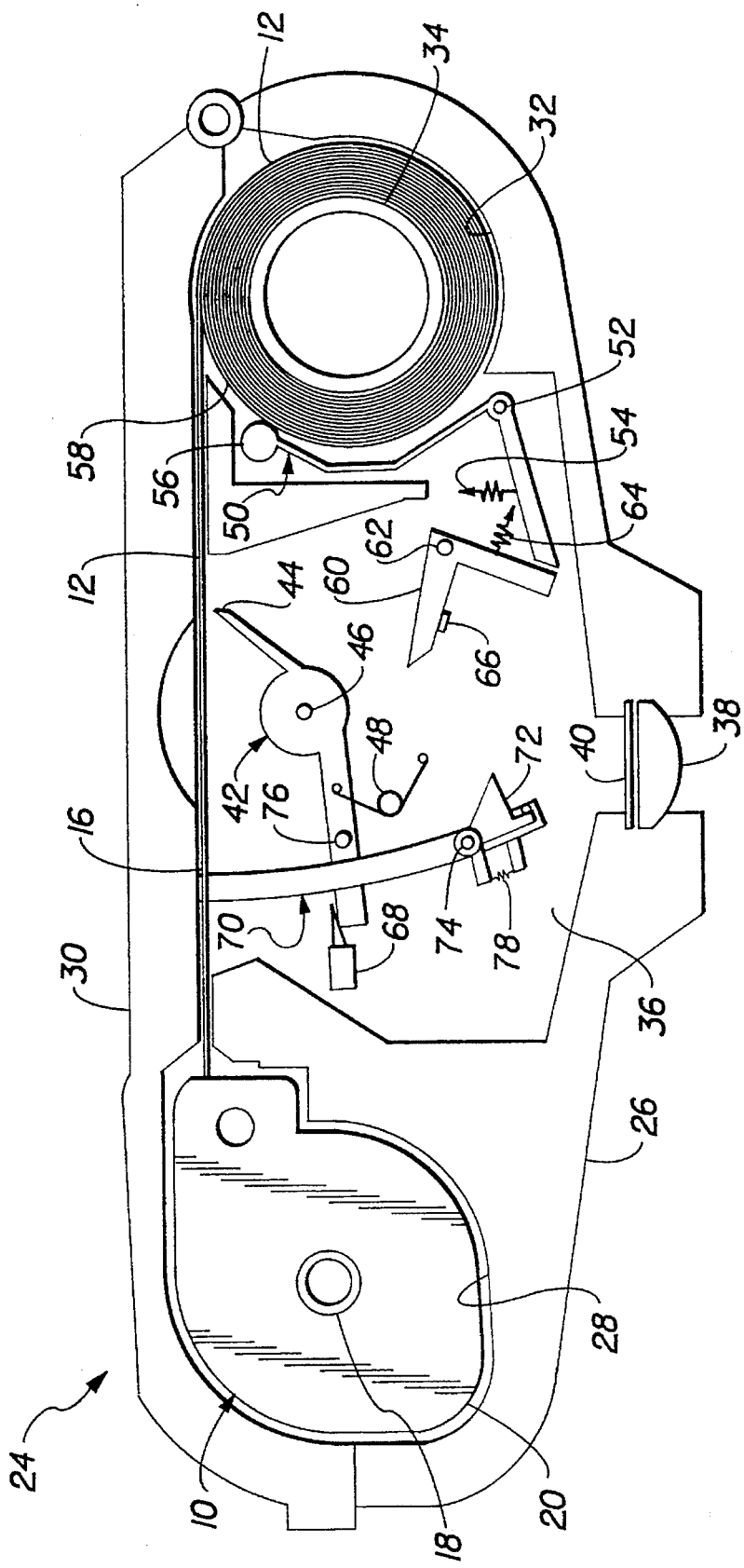

FIGS. 2–4 depict a still-picture camera 24 having a camera body 26. The camera body 26 as is typical includes a loading chamber 28 for receiving the film cartridge 10 when a rear door 30 of the camera body is open, a take-up chamber 32 containing a rotatably supported film take-up spool 34, and a back frame opening 36 in which successive frames of the filmstrip are exposed via a taking lens 38 and a shutter 40. In operation, motor-driven unwinding rotation of the film supply spool 18 inside the cartridge housing 20 advances the filmstrip 12 beginning with its leading end portion 22 from the cartridge interior, across the back frame opening 36, and onto the take-up spool 34. Motor-driven unwinding rotation of the film supply spool 18 is then discontinued, and motor-driven winding rotation of the take-up spool 34 prewinds the filmstrip 12 except for its trailing end portion 16 onto the take-up spool before any exposures are made. During picture-taking, after each exposure is made, motor-driven winding rotation of the film supply spool 18 returns the exposed frame to the cartridge housing 20.

Alternatively, only the leading end portion 22 of the filmstrip 12 need be wound onto the take-up spool 34. Then, during picture-taking, after each exposure is made, motor-driven winding rotation of the take-up spool 34 winds the exposed frame onto the take-up spool. When the filmstrip 12 except for its trailing end portion 16 is exposed, motor-driven winding rotation of the film supply spool 18 returns the filmstrip to the cartridge housing 20.

A perforation sensor 42 has a sensing end 44 tapered to be able to drop into the turn-around perforation 14 in the trailing end portion 16 of the filmstrip 12. The perforation sensor 42 is supported on a pivot pin 46 to be pivoted in a clockwise direction as viewed in FIG. 2 from a ready or original position shown in FIG. 2, to a sensing position shown in FIG. 3 in which the sensing end 44 is biased against the filmstrip 12 to drop into the turn-around perforation 14 when the turn-around perforation is advanced to the sensing end, and thence in the same direction as viewed in FIG. 3 to a retracted position shown in FIG. 4 in which the sensing end is removed from the turn-around perforation. Also, the perforation sensor 42 is supported to be pivoted in a counter-clockwise direction as viewed in FIG. 4 from its retracted position shown in FIG. 4 to its ready position shown in FIG. 2. A known type overcenter spring 48 has one leg end connected to the perforation sensor 42 and another leg end connected to the camera body 26 to alternatively pivot the perforation sensor in the clockwise and counter-clockwise directions to its ready and retracted positions.

A film-on-spool sensor 50 is supported on a pivot pin 52 to permit a a tension spring 54 to pivot the sensor in a clockwise direction as viewed in FIG. 3 to urge a roller end 56 of the sensor against the outermost convolution 58 of the filmstrip 12 as the filmstrip accumulates on the take-up spool 34. The film-on-spool sensor 50 in response to increased accumulation of the filmstrip 12 on the take-up spool 34 is pivoted in a counter-clockwise direction as viewed in FIG. 3 to separate from a lever 60 which is supported on a pivot pin 62. As a result, a tension spring 64 pivots the lever 60 in a counter-clockwise direction as viewed in FIG. 3 to make the lever pivot the perforation sensor 42 in a clockwise direction as viewed in FIG. 3 from its ready position shown in FIG. 2 to its sensing position shown in FIG. 3. Since the sensing end 44 of the perforation sensor 42 is then located against the filmstrip 12, the tension spring 64 cannot continue to pivot the lever 60 toward a stop 66, and the film-on spool sensor 50 moves away from the lever as shown in FIG. 3.

Alternatively, the film-on spool sensor 50 can be adapted to effect pivoting of the perforation sensor 42 itself without any need for the lever 60.

When the perforation sensor 42 is in its sensing position and the filmstrip 12 is advanced sufficiently to locate the turn-around perforation 14 opposite the sensing end 44 of the perforation sensor, the tension spring 64 urges the lever 60 to pivot the perforation sensor to move its sensing end into the turn-around perforation; whereupon, the lever comes to rest against the stop 66, and further advance of the filmstrip 12 in engagement with the sensing end pivots the perforation sensor in a clockwise direction as viewed in FIG. 3 to enable the overcenter spring 48 to pivot the perforation sensor in the same direction to its retracted position shown in FIG. 4. In the retracted position, the perforation sensor 42 closes a normally open switch 68 to initiate motor-driven winding rotation of the film supply spool 18 to return the exposed frame to the cartridge housing 20 after each exposure is made.

When the rear door 30 of the camera body 26 is opened, a resetting finger 70 projecting inwardly from the door is partially retracted from the camera body 26, and an actuator 72 mounted on the finger via a pivot pin 74 is pivoted beneath a stud 76 on the perforation sensor contrary to the urging of a return spring 78. Conversely, when the door 30 is closed, the actuator 72 (rather than being pivoted beneath the stud 76) pushes against the stud to pivot the perforation sensor 42 in a counter-clockwise direction as viewed in FIG. 4 from its retracted position shown in FIG. 4 to enable the overcenter spring to pivot the sensor in the same direction to its ready position shown in FIG. 2.

The invention has been described with reference to a preferred embodiment. However, it will be appreciated that variations and modifications can be effected by a person of ordinary skill in the art without departing from the scope of the invention.

PARTS LIST 10. film cartridge
12. filmstrip
14. turn-around perforation
16. trailing end portion
18. film supply spool
20. cartridge housing
22. leading end portion
24. still-picture camera
26. camera body
28. loading chamber
30. rear door
32. take-up chamber
34. film take-up spool
36. back frame opening
38. taking lens
40. shutter
42. perforation sensor
44. sensing end
46. pivot pin
48. overcenter spring
50. film-on-spool sensor
52. pivot pin
54. tension spring
56. roller end
58. outermost convolution
60. lever
62. pivot pin
64. tension spring
66. stop
68. switch
70. resetting finger
72. actuator
74. pivot pin
76. stud
78. return spring

I claim:

1. A film transport mechanism for a camera comprising a film take-up spool rotated to advance a filmstrip from a film cartridge onto said take-up spool, and a perforation sensor for detecting a turn-around perforation in a trailing end portion of the filmstrip to initiate return of the filmstrip from said take-up spool to the film cartridge, is characterized in that:

said perforation sensor is movable to a sensing position against the filmstrip to be able to drop into the turn-around perforation when the turn-around perforation is advanced to the perforation sensor; and film-on-spool sensor means is located against an outermost convolution of the filmstrip as the filmstrip accumulates on said take-up spool, and is moved in response to increased accumulation of the filmstrip on said take-up spool for effecting movement of said perforation sensor to its sensing position before the turn-around perforation can be advanced to the perforation sensor.

2. A film transport mechanism as recited in claim 1, wherein said perforation sensor is supported to be displaced in a first direction to a ready position located to be moved its sensing position and to be displaced in a reverse direction to a retracted position removed from the turn-around perforation, and an overcenter spring is connected to said perforation sensor to alternatively displace the perforation sensor in the first and reverse directions to its ready and retracted positions.

3. A film transport mechanism as recited in claim 2, wherein said perforation sensor is supported to be displaced in the reverse direction as the filmstrip is advanced with the perforation sensor dropped into the turn-around perforation to enable said overcenter spring to displace the perforation sensor to its retracted position.

4. A film transport mechanism as recited in claim 3, wherein normally open switch means is located to be closed by said perforation sensor to initiate return of the filmstrip from said take-up spool to the film cartridge when the perforation sensor is displaced to its retracted position.

5. A film transport mechanism as recited in claim 3, wherein resetting means is actuated responsive to movement of a mechanical device to permit replacement of the film cartridge in the camera for moving said perforation sensor in the first direction from its retracted position to enable said overcenter spring to displace the perforation sensor to its ready position.

* * * * *